United States Patent
Propheter-Hinckley

(10) Patent No.: US 10,774,005 B2
(45) Date of Patent: Sep. 15, 2020

(54) NEEDLED CERAMIC MATRIX COMPOSITE COOLING PASSAGES

(71) Applicant: United Technologies Corporation, Farmington, CT (US)

(72) Inventor: Tracy A. Propheter-Hinckley, Manchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 352 days.

(21) Appl. No.: 15/863,160

(22) Filed: Jan. 5, 2018

(65) Prior Publication Data

US 2019/0210929 A1    Jul. 11, 2019

(51) Int. Cl.

| C04B 35/64 | (2006.01) |
| C04B 35/80 | (2006.01) |
| B28B 7/16 | (2006.01) |
| B28B 7/28 | (2006.01) |
| B28B 7/34 | (2006.01) |
| C04B 35/622 | (2006.01) |
| F01D 5/18 | (2006.01) |
| B32B 18/00 | (2006.01) |

(Continued)

(52) U.S. Cl.
CPC .......... *C04B 35/62218* (2013.01); *B28B 7/16* (2013.01); *B28B 7/28* (2013.01); *B28B 7/342* (2013.01); *B32B 18/00* (2013.01); *C04B 35/64* (2013.01); *C04B 35/80* (2013.01); *F01D 5/18* (2013.01); *F01D 5/187* (2013.01); *C04B 2235/6028* (2013.01); *C04B 2237/38* (2013.01); *C04B 2237/62* (2013.01); *F05D 2220/32* (2013.01); *F05D 2230/211* (2013.01); *F05D 2260/201* (2013.01); *F05D 2300/6033* (2013.01)

(58) Field of Classification Search
None
See application file for complete search history.

(56) References Cited

U.S. PATENT DOCUMENTS

| 5,186,776 A | 2/1993 | Boyce et al. |
| 6,627,019 B2 | 9/2003 | Jarmon et al. |

(Continued)

FOREIGN PATENT DOCUMENTS

EP    3059390 A1    8/2016

OTHER PUBLICATIONS

European Search Report dated May 24, 2019 for corresponding European Patent Application No. 19150594.0.

(Continued)

*Primary Examiner* — Alison L Hindenlang
*Assistant Examiner* — Andrés E. Behrens, Jr.
(74) *Attorney, Agent, or Firm* — Bachman & LaPointe, P.C.

(57) ABSTRACT

A method for forming a hole within a ceramic matrix composite component includes forming a first core portion for a ceramic matrix composite component; embedding a hollow member into the first core portion at a desired location; wrapping the first core portion with a first ceramic matrix composite material; inserting a rod through the hollow member and into the first core portion; removing the hollow member; assembling a second core portion to the first core portion such that the rod extends into the second core portion; and wrapping the first core portion and the second core portion with a second ceramic matrix composite material.

7 Claims, 16 Drawing Sheets

(51) Int. Cl.
*B28B 7/18* (2006.01)
*B28B 7/02* (2006.01)

(56) References Cited

U.S. PATENT DOCUMENTS

| | | |
|---|---|---|
| 8,202,588 B2 | 6/2012 | Keller et al. |
| 8,216,641 B2 | 7/2012 | Bouchard et al. |
| 9,161,461 B2 | 10/2015 | Hurwitz et al. |
| 2006/0121265 A1 | 6/2006 | Thompson et al. |
| 2008/0025846 A1 | 1/2008 | Vance et al. |
| 2008/0199661 A1 | 8/2008 | Keller et al. |
| 2008/0203236 A1 | 8/2008 | Mazzola et al. |
| 2010/0068034 A1 | 3/2010 | Schiavo et al. |
| 2016/0115086 A1 | 4/2016 | Tuertscher et al. |
| 2016/0177743 A1 | 6/2016 | Thomas et al. |
| 2016/0348515 A1* | 12/2016 | Varney .................... C04B 35/80 |
| 2017/0328217 A1 | 11/2017 | Gallier et al. |
| 2017/0356296 A1 | 12/2017 | Tibbott et al. |

OTHER PUBLICATIONS

European Search Report dated Sep. 19, 2019 for related European Patent Application No. 19150594.0.
European Search Report dated Sep. 19, 2019 for corresponding European Patent Application No. 19150605.4.

\* cited by examiner

NEEDLED CERAMIC MATRIX COMPOSITE COOLING PASSAGES

BACKGROUND

The present disclosure relates to ceramic matrix composite components, and more particularly, to an internal cooling passage.

Gas turbine engines typically include a compressor section to pressurize airflow, a combustor section to burn a hydrocarbon fuel in the presence of the pressurized air, and a turbine section to extract energy from the resultant combustion gases. Gas path components, such as turbine blades, often include airfoil cooling that may be accomplished by external film cooling, internal air impingement, and forced convection, either separately, or in combination.

Ceramic matrix composite (CMC) components can endure high temperatures, but those temperatures may be below the gas path operational temperatures of some modern turbine engine stages. Internal convective cooling of CMC components may be primarily from impingement baffle like structures and film cooling from cooling passages. The cooling passages are either drilled using laser or Electron Discharge Machining (EDM). Laser passages are ideal for relatively short passages such as those at the leading edge of an airfoil, while EDM is ideal for long passages such as those at the trailing edge. EDM relies on a current supplied to an electrode which is discharged through a grounded part, however CMC material cannot carry current, and cannot use EDM. Machining cooling passages in the CMC component may result in cut fibers in the CMC material which may weaken the CMC component or expose a surface to environmental attacks.

SUMMARY

A method for forming a hole within a ceramic matrix composite component according to one disclosed non-limiting embodiment of the present disclosure includes forming a first core portion for a ceramic matrix composite component; embedding a hollow member into the first core portion at a desired location; wrapping the first core portion with a first ceramic matrix composite material; inserting a rod through the hollow member and into the first core portion; removing the hollow member; assembling a second core portion to the first core portion such that the rod extends into the second core portion; and wrapping the first core portion and the second core portion with a second ceramic matrix composite material.

A further aspect of the present disclosure includes separating a plurality of fibers around the hollow member.

A further aspect of the present disclosure includes penetrating the ceramic matrix composite material with the hollow member.

A further aspect of the present disclosure includes coaxially forming a hole in the first core portion for the rod within a hole in the first core portion for the hollow member.

A further aspect of the present disclosure includes removing the hollow member and leaving the rod in the first core portion.

A method for forming a hole within a ceramic matrix composite component according to one disclosed non-limiting embodiment of the present disclosure includes forming a first core portion for a ceramic matrix composite component; embedding a hollow member into the first core portion at a desired location; wrapping the first core portion with a first ceramic matrix composite material; inserting a rod through the hollow member and into the first core portion; assembling a second core portion to the first core portion such that the rod extends into the second core portion; and wrapping the first core portion and the second core portion with a second ceramic matrix composite material; and burning out the first core portion, the second core portion, the hollow member, and the rod from the ceramic matrix composite material subsequent to wrapping the first core portion and the second core portion with the second ceramic matrix composite material.

A further aspect of the present disclosure includes that the hollow member is manufactured of a nylon.

A core for a ceramic matrix composite component according to one disclosed non-limiting embodiment of the present disclosure includes a first core portion; a second core portion; and a rod extending between the first core portion and the second core portion.

A further aspect of the present disclosure includes that the first core portion is adjacent a trailing edge of the ceramic matrix composite component.

A further aspect of the present disclosure includes that the second core portion is adjacent a leading edge of the ceramic matrix composite component.

A further aspect of the present disclosure includes that the second core portion will form an impingement passage within the ceramic matrix composite component.

A further aspect of the present disclosure includes that the rod is manufactured of the same material as the first core portion and the second core portion.

A further aspect of the present disclosure includes that the rod is of a desired cooling hole shape.

A further aspect of the present disclosure includes that the rod is glued into the first core portion.

A further aspect of the present disclosure includes that the first ceramic matrix composite material forms an internal wall within an airfoil.

A further aspect of the present disclosure includes a plurality of fibers through which the rod extends but does not cut.

A further aspect of the present disclosure includes a second ceramic matrix composite material that wraps the first core portion and the second core portion.

A further aspect of the present disclosure includes a hole for the rod coaxial within a hole for a hollow member.

A further aspect of the present disclosure includes that an inner surface of the hollow member is sized to receive the rod, the hollow member extending between the first core portion and the second core portion.

A further aspect of the present disclosure includes that each of the first core portion and the second core portion include a multiple of grooves.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
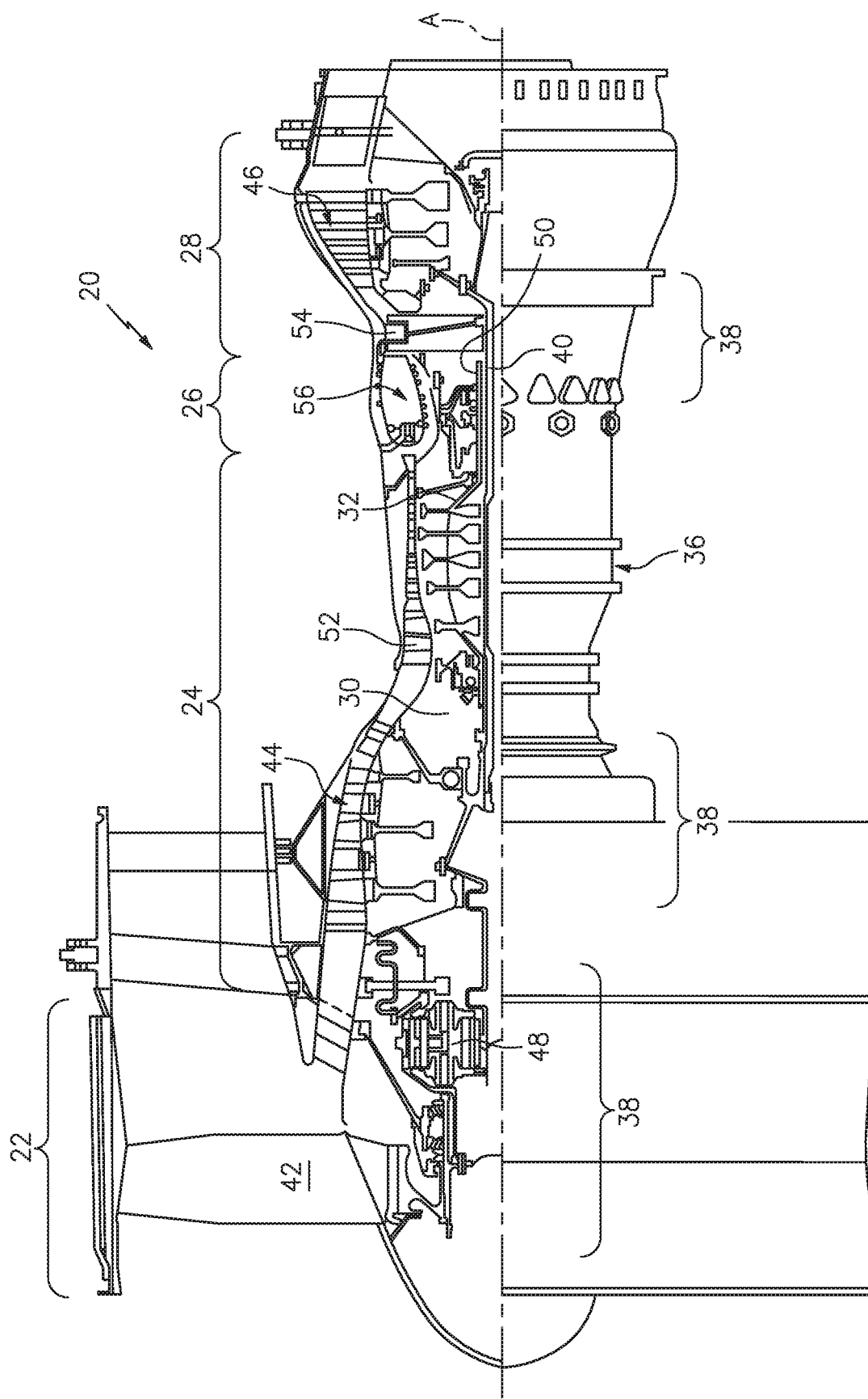
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
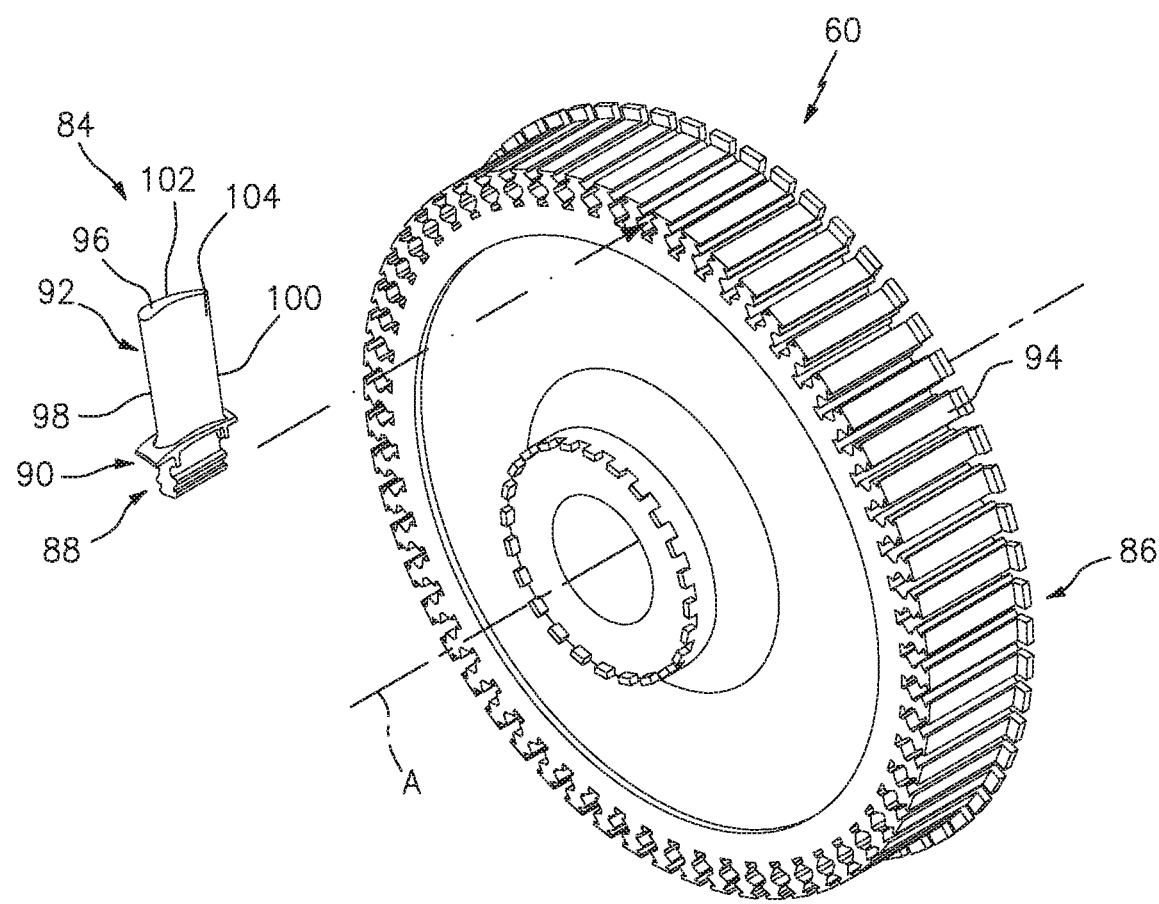
FIG. 2 is an exploded view of rotor assembly with a single representative ceramic matrix composite turbine blade.

With reference to FIG. 2, a rotor assembly 60 such as a turbine rotor assembly includes an array of blades 84 (one shown) circumferentially disposed around a disk 86. Each blade 84 includes a root 88, a platform 90 and an airfoil 92. The blade root 88 is received within a rim 94 of the disk 86 and the airfoil 92 extends therefrom.

The platform 90 separates a gas path side inclusive of the airfoil 92 and a non-gas path side inclusive of the root 88. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Figure 3:
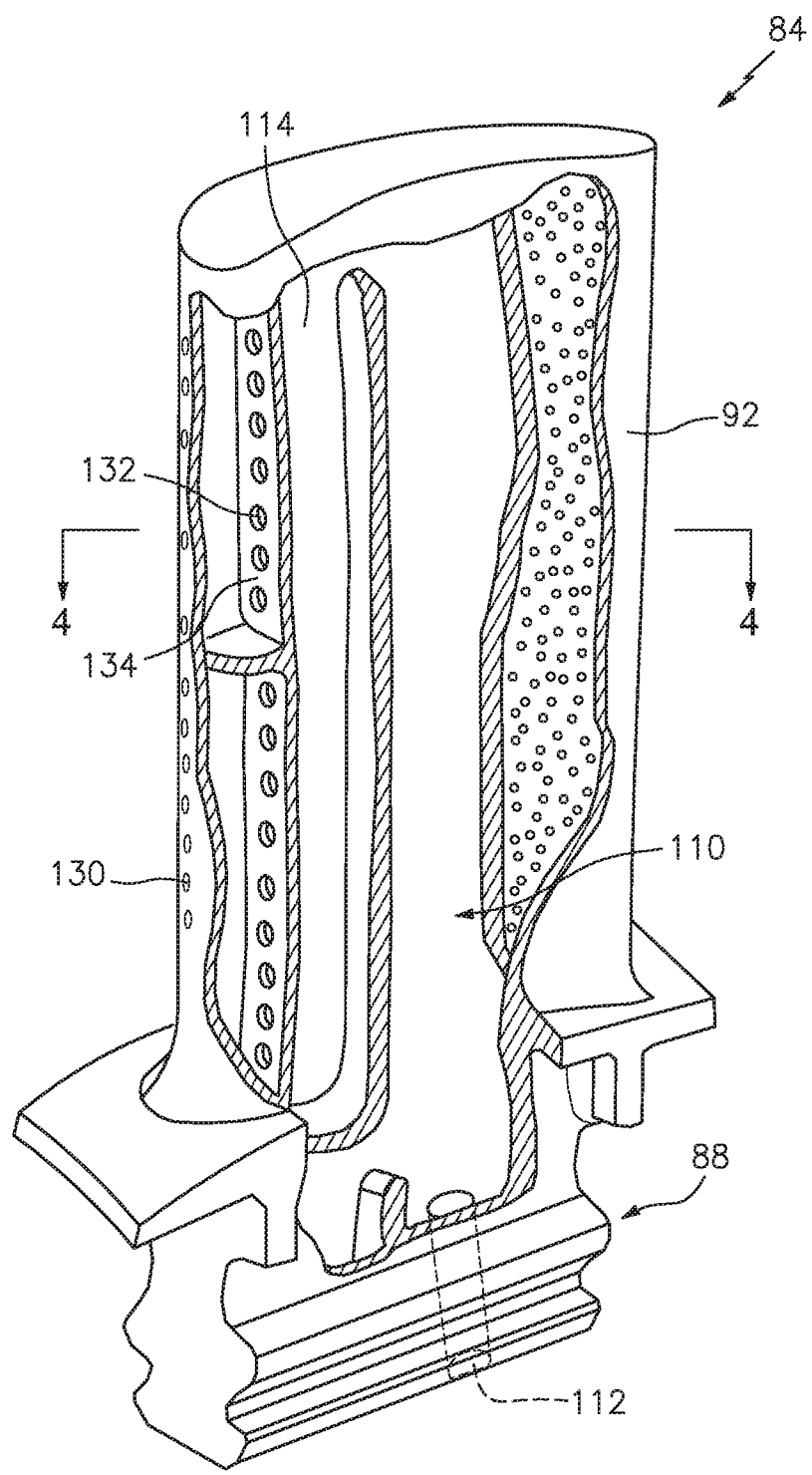
FIG. 3 is a cross-sectional illustration of an example ceramic matrix composite turbine blade of the gas turbine engine.
Figure 4:
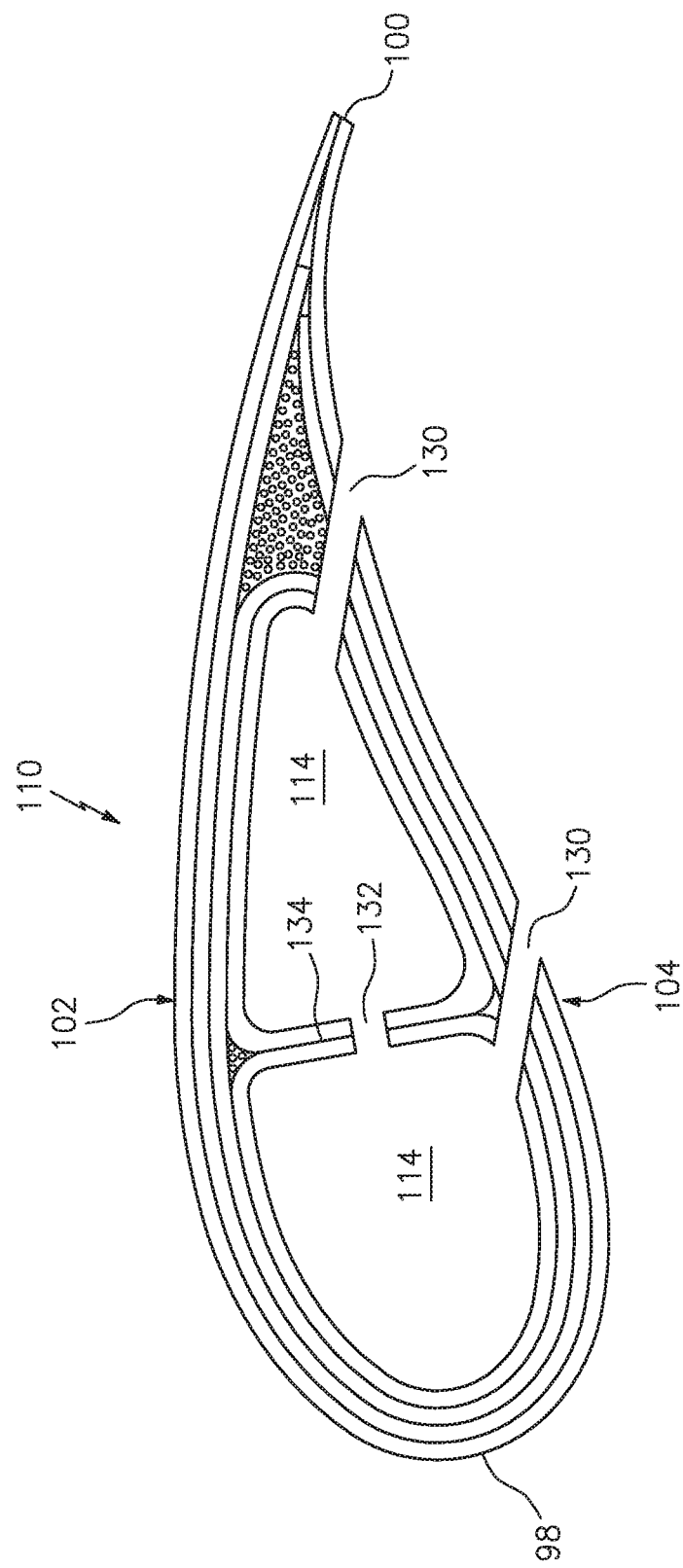
FIG. 4 is a cross-sectional illustration of an example ceramic matrix composite turbine blade taken along line 4-4 in FIG. 3.

With reference to FIG. 3, to resist the high temperature stress environment in the gas path of a turbine engine, each blade 84 includes an array of internal passageways 110. The array of internal passageways 110 includes a multiple of feed passages 112 through the root 88 that communicates airflow into a multiple of cavities 114 (shown schematically) within the airfoil 92. The cavities 114 distribute the cooling flow through passages 130 in the sidewalls 102, 104, leading edge 98, and/or the trailing edge 100 (also shown in FIG. 4). Impingement passages 132 (FIG. 4) may also be located though internal walls 134 between one or more of the array of internal passageways 110. It should be appreciated that various feed architectures, cavities, and passageway arrangements will benefit herefrom.

Figure 5:
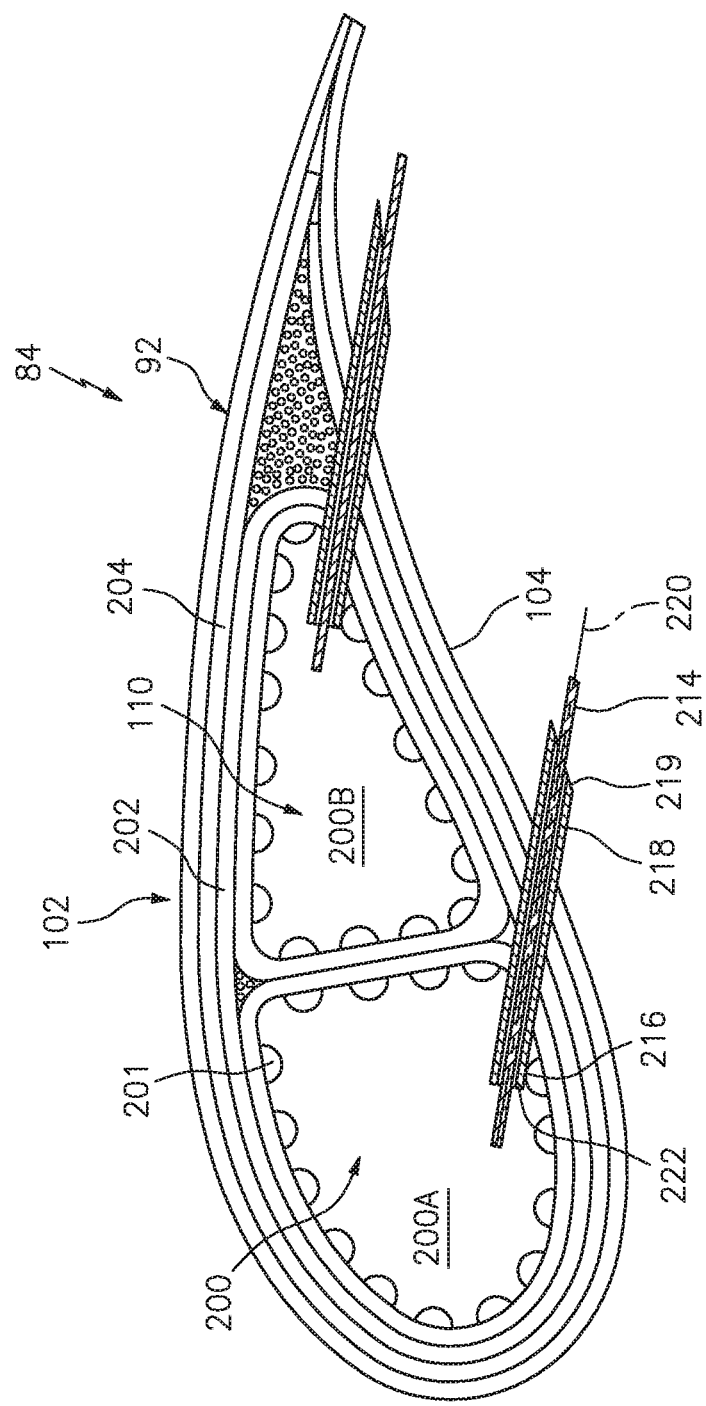
FIG. 5 is a cross-sectional illustration of an example ceramic matrix composite turbine blade taken along line 4-4 in FIG. 3 illustrating a method to form a passage in the ceramic matrix composite component.

With reference to FIG. 5, the example cooled turbine airfoil 84 is manufactured as a CMC component. Though the CMC may have less strength relative to metallic counterparts, CMCs can endure higher material temperatures and are significantly lighter. Although a turbine blade will be used to illustrate the disclosed cooling passage formation method, other components will also benefit herefrom.

The example turbine airfoil 84 is generally formed from a core 200 which may be formed from multiple portions 200A, 200B which are wrapped with a ceramic material 202. The core 200 is later removed such that the cured ceramic material 202 forms the airfoil 92 and the array of internal passageways 110. The core 200 may comprise a material such as carbon. The core 200 is readily cast and/or machined with conventional methods then later removed without damage to the ceramic material 202. The core 200 may include a multiple of longitudinal grooves 201.

The ceramic material 202 may be an arrangement of ceramic fibers 204. Examples of the ceramic material 202 may include a three-dimensional weave of the ceramic fibers 204. Alternatively, or in addition, the ceramic material 202 may include a two-dimensional weave of the ceramic fibers 204. The ceramic material 202 may include multiple layers of two-dimensional weave of the ceramic fibers 204. Alternatively, or in addition, the ceramic material 202 may include a fiber layup, such as a unidirectional layup. In some examples, each of the ceramic fibers 204 may be a bundle and/or a tow of ceramic fibers. The fibers in each bundle or tow may be braided or otherwise arranged. The ceramic fibers 204 may comprise a material that is stable at temperatures above 1000 degrees Celsius. Examples of the ceramic fibers 204 may include fibers of alumina, mullite, silicon carbide, silicon, zirconia or carbon.

Figure 6:
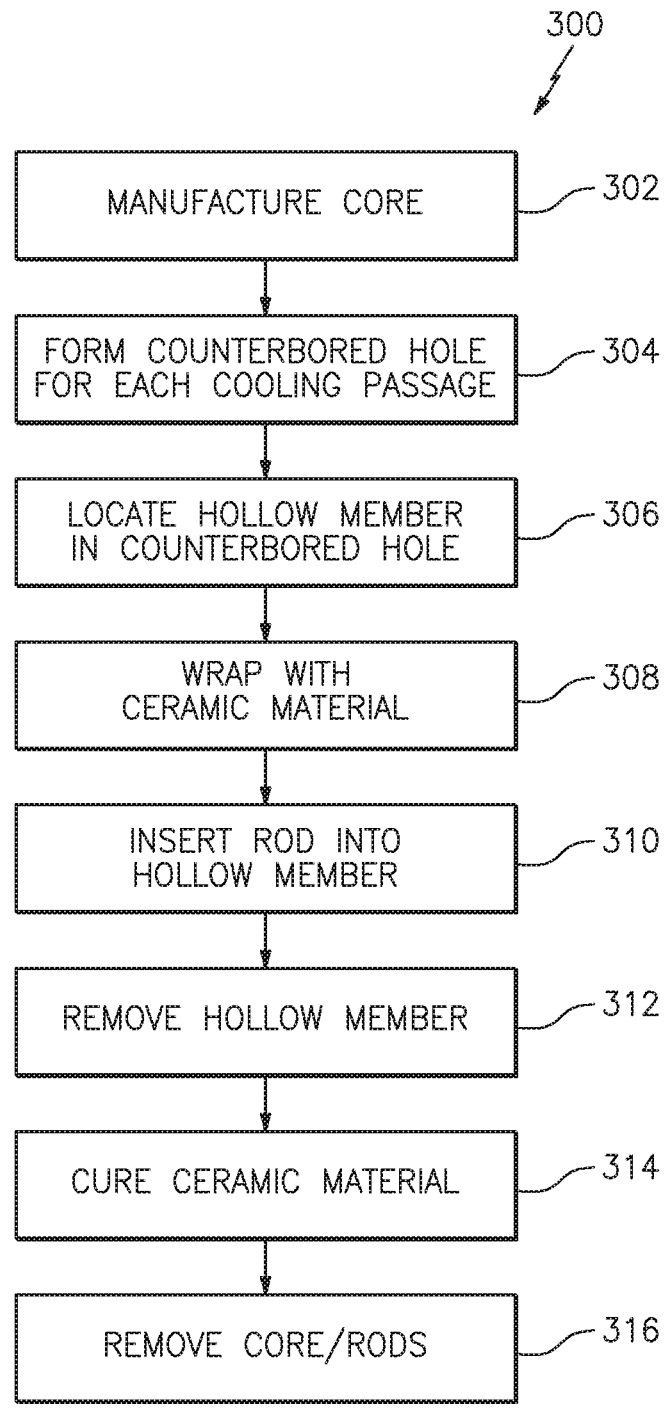
FIG. 6 illustrates a flow diagram of an example method to form a passage in the ceramic matrix composite component.

With reference to FIG. 6, a method 300 for forming the passages 130 through, for example, the airfoil sidewall 102, 104 (FIG. 4) in a ceramic matrix composite component is illustrated in a schematic block diagram form. It should also be appreciated that application is not limited to aerospace components and various other applications will benefit herefrom.

Figure 7:
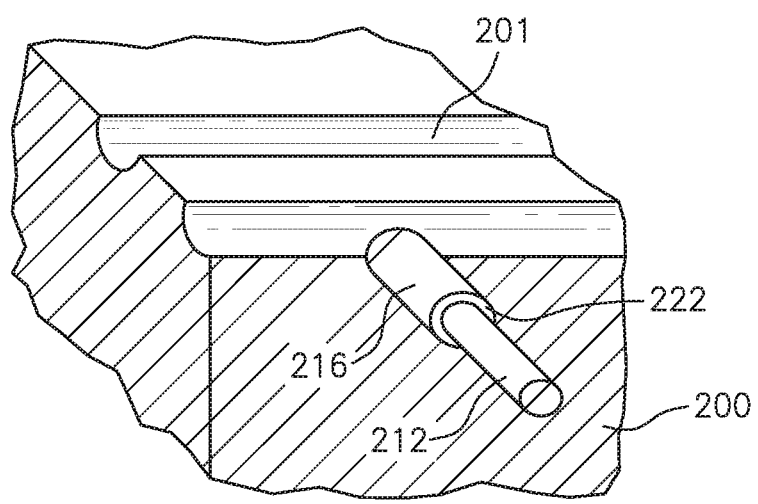
FIG. 7 illustrates a cross-sectional view of a core for a ceramic matrix composite component illustrating a step of the method of FIG. 6 illustrating drilling a counter bored hole.

Once the core 200 is manufactured (302), a counterbored hole 212/216 (FIG. 7) is drilled (304; FIG. 6) at each location in which the passages 130 are to be formed. The counterbored hole 212/216 includes a blind hole 212 for a rod 214 within a blind hole 216 for a hollow member 218 along a common axis 220 (FIG. 5). A step 222 is formed between the blind holes 212, 216 to form a stop for the hollow member 218. Each counterbored hole 212/216 is located and oriented to form the respective passages 130.

Figure 8:
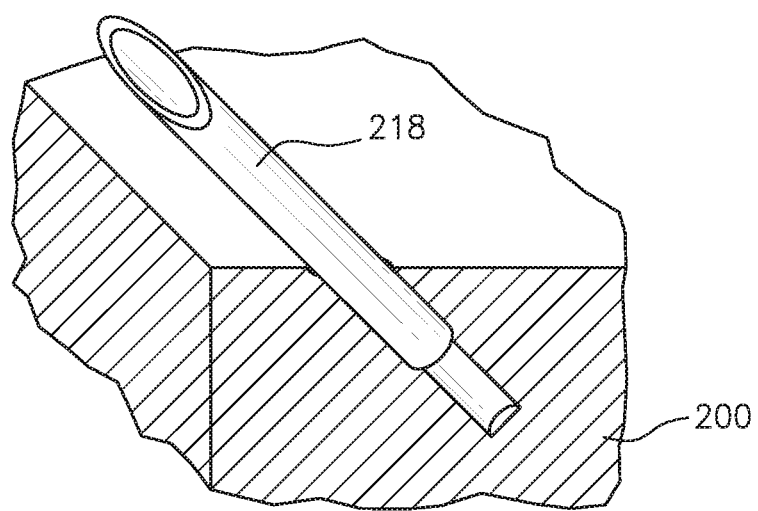
FIG. 8 illustrates a cross-sectional view of a core for a ceramic matrix composite component illustrating a step of the method of FIG. 6 illustrating embedding a hollow member into the core.

Next, the hollow member 218 is located in each blind hole 216 (306, FIG. 6; FIG. 8). The hollow member 218 has an interior diameter equal to or greater to the size of the desired passage 130. The outside diameter may be equal to or slightly smaller than the blind hole 216. The hollow member 218 may include a sharp end 219 to form a hollow needle and may be manufactured of a metal alloy, a nylon, or any other rigid material that is compatible with the CMC material.

Figure 9:
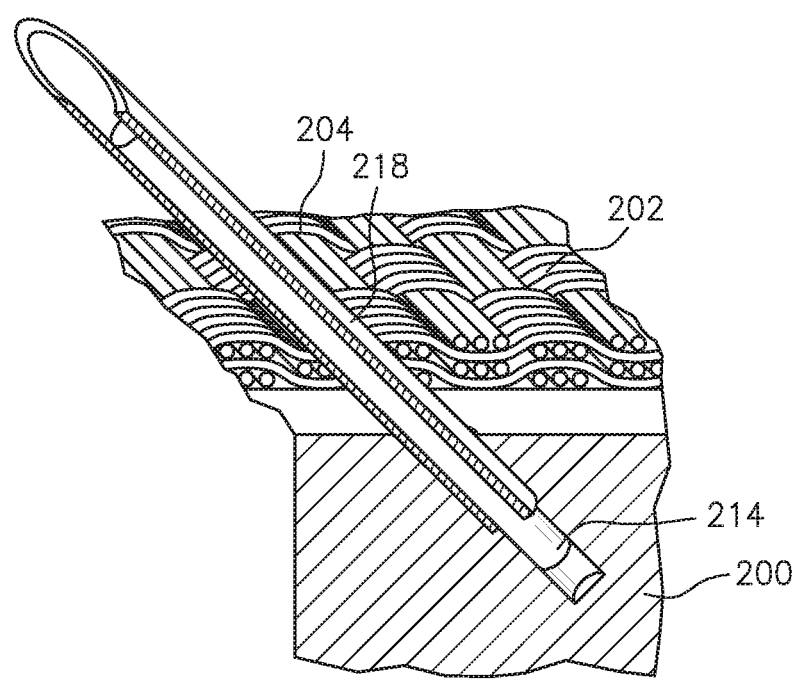
FIG. 9 illustrates a cross-sectional view of a core for a ceramic matrix composite component illustrating a step of the method of FIG. 6 illustrating wrapping with a ceramic material such that the hollow member penetrates therethrough.

Next, the core 200 is wrapped with the ceramic material 202 using the hollow member 218 to pierce through the ceramic material 202 (308, FIG. 6; FIG. 9). The ceramic material 202 comprises the plurality of fibers 204 through which the hollow member 218 extends but does not cut. The hollow members 218 are of a strength to penetrate and separate the plurality of fibers 204.

Figure 10:
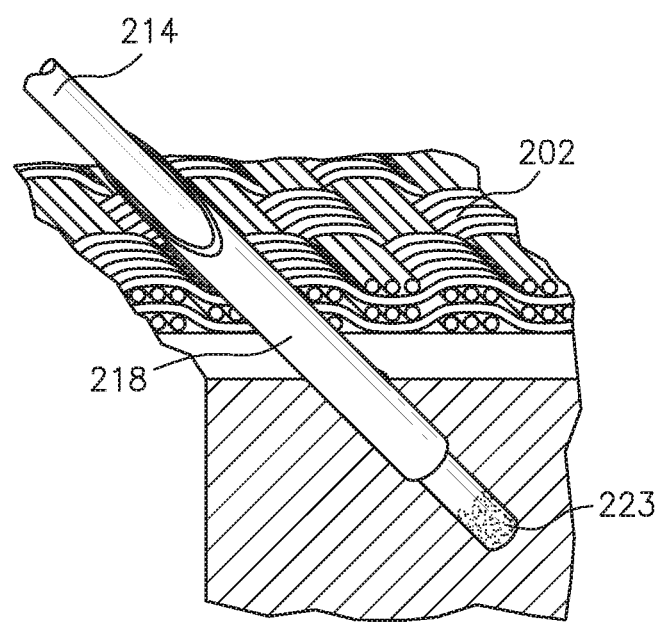
FIG. 10 illustrates a cross-sectional view of a core for a ceramic matrix composite component illustrating a step of the method of FIG. 6 illustrating inserting a rod into the hollow member.

The core 200 is wrapped with the ceramic material 202 to form a ceramic matrix composite body that may be the CMC component in which the passage 130 is to be formed. Alternatively, the ceramic matrix composite body may be a component of the CMC component in which the passage 130 is to be formed. The ceramic matrix composite body may comprise of, for example, a silicon carbide ceramic matrix composite. The ceramic matrix composite body may have any shape or form, not just the shape illustrated. Once all the layers of the ceramic material 202 are in place, one rod 214 is inserted into each hollow member 218 (310, FIG. 6; FIG. 10).

The rod 214 is shaped and sized to form the desired passages 130. The rod 214 may be formed of the same material as the core such as a carbon. The rod 214 may be circular, rectilinear, oval, racetrack, or of other cross-sectional shape. Optionally, each rod 214 may be glued into each blind hole 212 with a glue 223.

Figure 11:
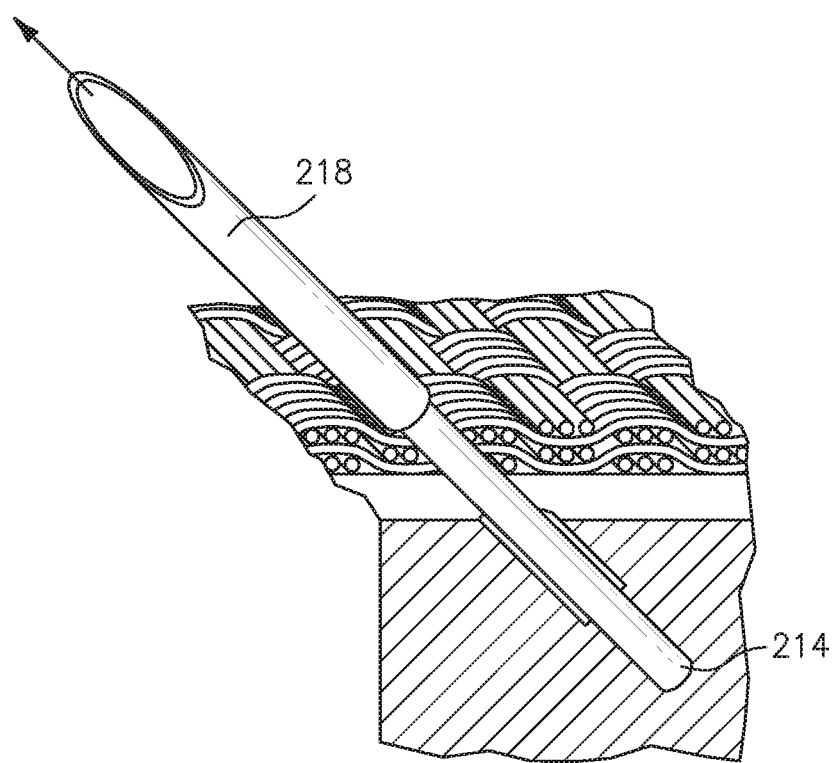
FIG. 11 illustrates a cross-sectional view of a core for a ceramic matrix composite component illustrating a step of the method of FIG. 6 illustrating removing the hollow member.
Figure 12:
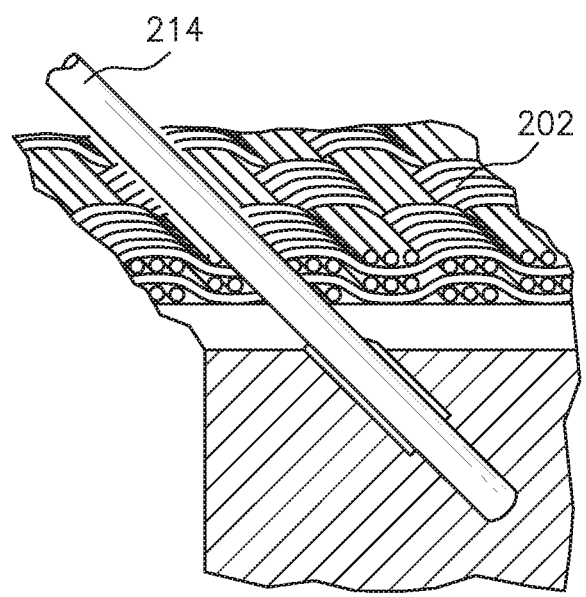
FIG. 12 illustrates a cross-sectional view of a core for a ceramic matrix composite component illustrating a step of the method of FIG. 6 illustrating the ceramic material closing around the rod.

Next, the hollow member 218 is removed (312, FIG. 6; FIG. 11) leaving the rod 214 in place. The ceramic material 202 then closes (FIG. 12) around the rod 214. The ceramic fibers 204 of the ceramic material 202 are not broken in this process, such that it is readily apparent that this method was used because any drilling method would result in the cutting of the ceramic fibers 204. Alternatively, the hollow member 218 can be manufactured of a material such as a nylon which can be readily burned out with the core 200 and then the rod 214 is burned out so that the hollow member need not be removed. That is, the hollow member 218 burns out at a lower temperature than infiltration temps then the rod 214 burns out with the core 200.

Next, the ceramic material 202 is cured (314, FIG. 6) per conventional CMC manufacturing procedures to form the CMC component. Forming the cooled turbine airfoil 84 as the CMC component may include infiltrating a molten metal or alloy into the ceramic material 202. The multiple of longitudinal grooves 201 (FIG. 7) facilitate the infiltration.

The molten metal or alloy fills the gaps between the ceramic fibers 204 and the rods 214. The molten metal or alloy may also react with a reactive element source present in the ceramic material 202 to form additional silicon based ceramic matrix material. In some examples, a chemical vapor infiltration coating may be applied to the ceramic material 202 prior to the melt infiltration to stiffen the ceramic fibers 204. Alternatively, or in addition, forming the CMC component from the ceramic material 202 may include chemical vapor infiltrating the ceramic material 202 instead of melt infiltrating.

Finally, the core 200 and rods 214 are removed (316, FIG. 6) via heat, acid, or other method which does not harm the ceramic material 202 per conventional CMC manufacturing procedures. Once the core 200 and rods 214 are removed, the passages 130 and the array of internal passageways 114 are formed.

Figure 13:
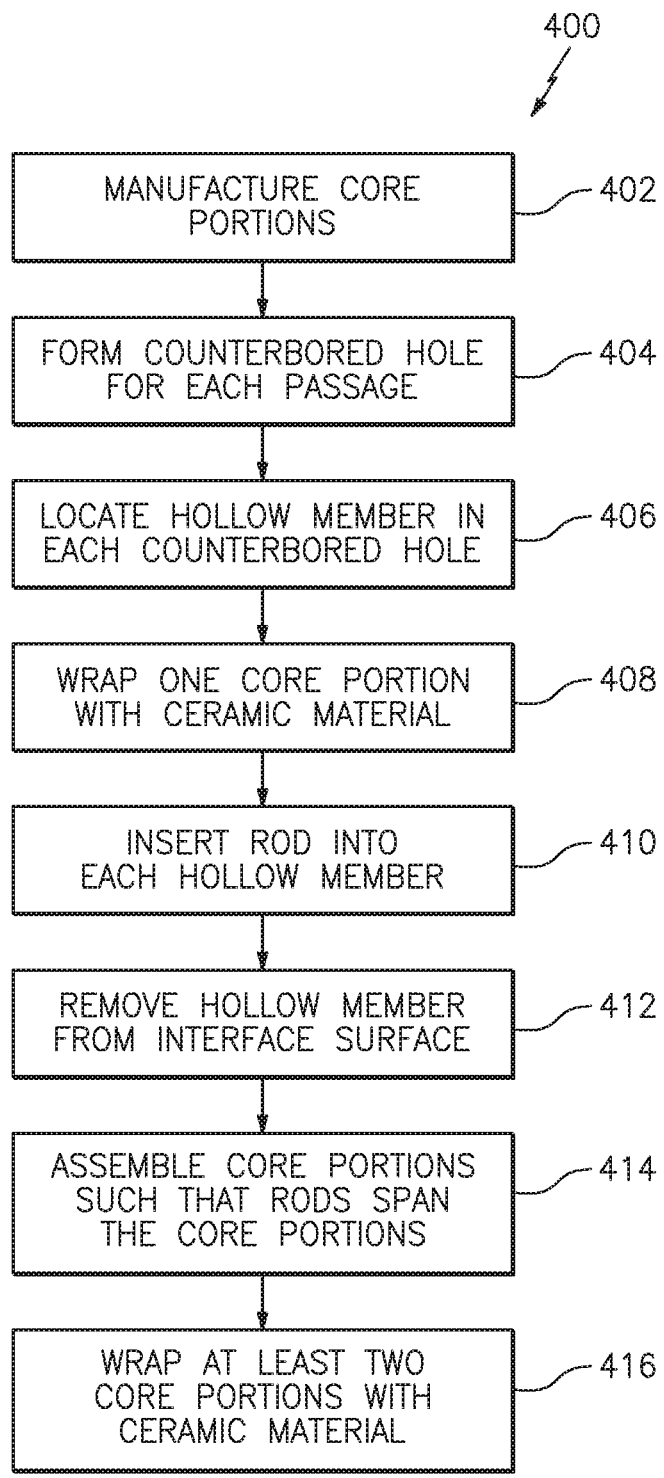
FIG. 13 illustrates a flow diagram of an example method to form an internal passage in the ceramic matrix composite component.

With reference to FIG. 13, a method 400 for forming the internal passages 132 through, for example, the internal walls 134 (FIG. 4) in a ceramic matrix composite component is illustrated in a schematic block diagram form. It should also be appreciated that application is not limited to aerospace components and various other applications will benefit herefrom.

Figure 14:
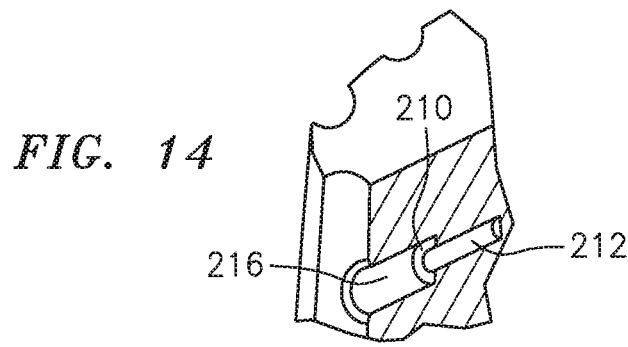
FIG. 14 illustrates a cross-sectional view of a core for a ceramic matrix composite component illustrating a step of the method of FIG. 13 illustrating drilling a counterbored hole in one core portion.

Once the core portions 200A, 200B are manufactured (402, FIG. 13), the counter bored holes 210 are drilled (404, FIG. 13; FIG. 14) at each location in which the external passages 130 and impingement passages 132 are to be formed. Although the first core portion 200A and the second core portion 200B are illustrated to represent formation of the core 200, any number of core portions may be utilized to form a desired internal structure.

Figure 15:
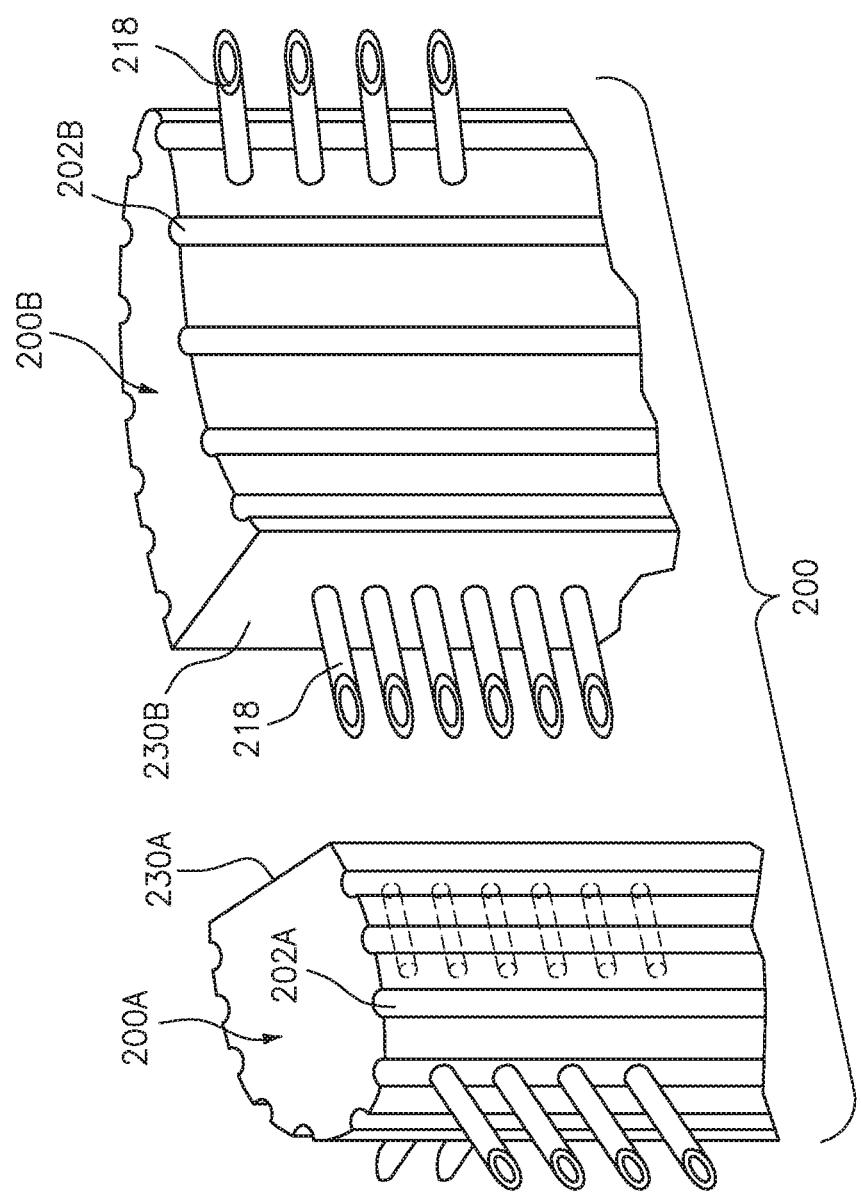
FIG. 15 illustrates a perspective view of a core for a ceramic matrix composite component illustrating a step of the method of FIG. 13 illustrating embedding a hollow member into the core portion.

Next, one hollow member 218 is located in each of the blind holes 216 (406, FIG. 13; FIG. 15) including those that are in an interface surface 230B. The interface surfaces 230A, 230B are shaped to form one side of the internal wall 134 that separates the cavities 114.

Figure 16:
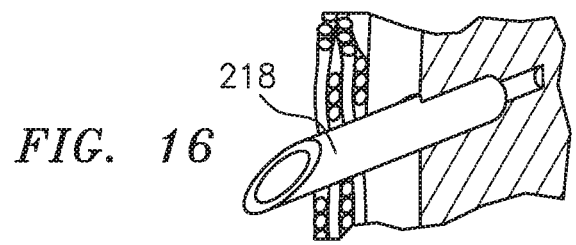
FIG. 16 illustrates a cross-sectional view of a core for a ceramic matrix composite component illustrating a step of the method of FIG. 13 illustrating wrapping the core portion with a ceramic material such that the hollow member penetrates therethrough.

Next, at least one core portion, here represented by core portion 200B, is wrapped (408, FIG. 13; FIG. 16) with the ceramic material 202 using the hollow member 218 to pierce through the ceramic material 202 as discussed above.

Figure 17:
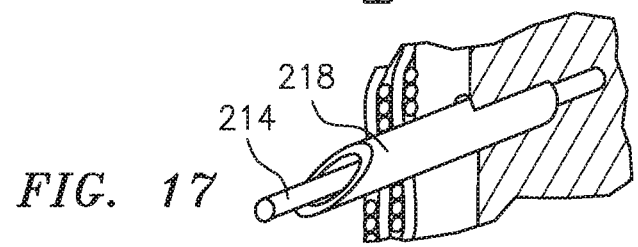
FIG. 17 illustrates a cross-sectional view of a core for a ceramic matrix composite component illustrating a step of the method of FIG. 13 illustrating inserting a rod into each hollow member.

Next, the rods 214 are inserted in each of the respective hollow members 218 (410, FIG. 13; FIG. 17).

Figure 18:
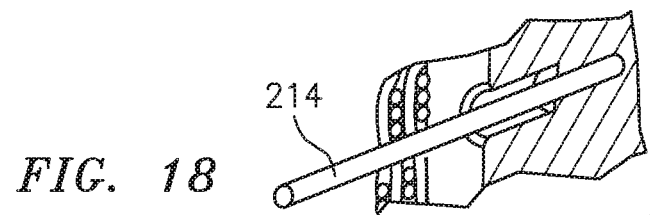
FIG. 18 illustrates a cross-sectional view of a core for a ceramic matrix composite component illustrating a step of the method of FIG. 13 illustrating removing the hollow member from an interface surface of the core portion.

Next, the hollow members 218 are removed (412, FIG. 13; FIG. 18) from the interface surface 230B leaving only the rods 214 in place. That is, the hollow members 218 remain in all surfaces other than the interface surface 230B which will interface with the interface surface 230A of core portion 200A. The core portions 200A, 200B may still retain the embedded hollow members 218 in surfaces other than the interface surfaces 230A, 230B such as those that will form surfaces of the component such as the airfoil sidewalls 102, 104.

Figure 19:
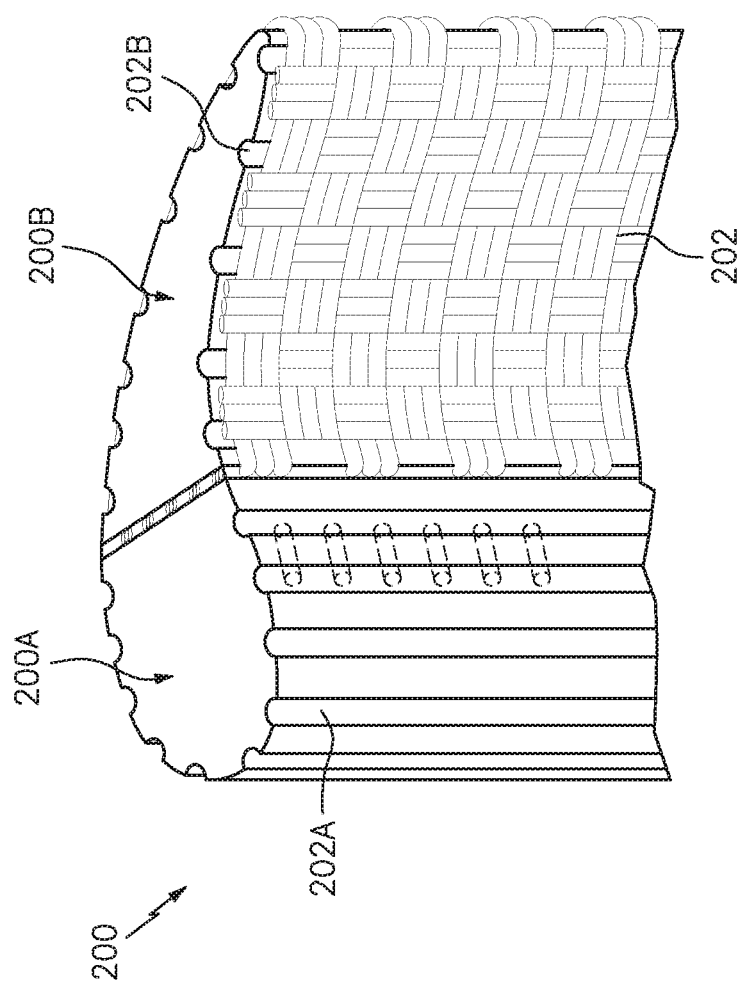
FIG. 19 illustrates a perspective view of a core for a ceramic matrix composite component illustrating a step of the method of FIG. 13 illustrating assembling two core portions.

Next, the core portion 200A is assembled (414, FIG. 13; FIG. 19) to the core portion 200B. The core portion 200A includes a multiple of blind holes 212 that correspond with each of the rods 214 in the core portion 200B. The rods 214 extend from the interface surface 230B to span the core portion 200A and the core portion 200B with the ceramic material 202 trapped therebetween. The rods 214 may be glued in place to retain the core portions 200A, such that the ceramic material 202 that forms the internal walls 134 is compressed between the core portions 200A, 200B to form a desired shape. That is, the interface surfaces 230A, 230B may be shaped to form the internal walls 134 into a desired shape.

Figure 20:
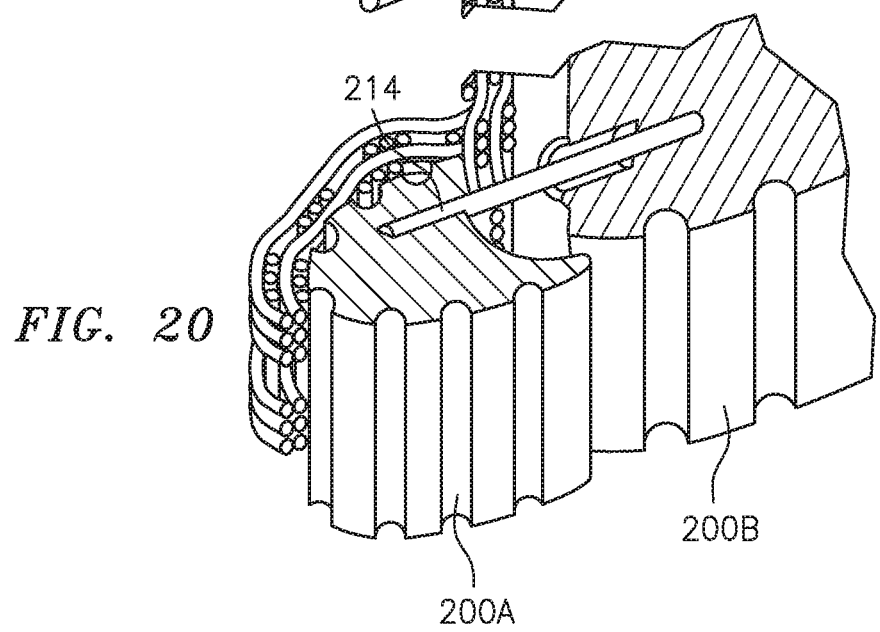
FIG. 20 illustrates a cross-sectional view of a core for a ceramic matrix composite component illustrating a step of the method of FIG. 13 illustrating assembling two example core portions.

Next, a multiple of core portions, here shown as the core portions 200A, 200B, are wrapped (416, FIG. 13; FIG. 20) with the ceramic material 202 using the hollow members 218 to pierce through the ceramic material 202 as described above. Any number of core portions may be respectively assembled to form the core 200 with particular core portions being wrapped as in 408.

The method 400 then continues with forming of the ceramic material 202 to form the ceramic matric composite component, then removal of the core portions and rods as described above in accordance with method 300.

The "cast in" passages 130, 132 are readily identifiable, may be of various cross-sectional shapes, reduce machining time, and facilitate the manufacture of long passages through CMC components such as those through the trailing edge of an airfoil.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method for forming a hole within a ceramic matrix composite component, the method comprising:
    forming a first core portion for a ceramic matrix composite component;
    embedding a hollow member into the first core portion at a desired location;
    wrapping the first core portion with a first ceramic matrix composite material;
    inserting a rod through the hollow member and into the first core portion;
    removing the hollow member;
    assembling a second core portion to the first core portion such that the rod extends into the second core portion; and
    wrapping the first core portion and the second core portion with a second ceramic matrix composite material.

2. The method as recited in claim 1, wherein wrapping the first core portion with the first ceramic matrix composite material comprises separating a plurality of fibers around the hollow member.

3. The method as recited in claim 1, wherein wrapping the first core portion with the first ceramic matrix composite material comprises penetrating the ceramic matrix composite material with the hollow member.

4. The method as recited in claim 1, further comprising coaxially forming a hole in the first core portion for the rod within a hole in the first core portion for the hollow member.

5. The method as recited in claim 1, further comprising removing the hollow member and leaving the rod in the first core portion.

6. A method for forming a hole within a ceramic matrix composite component, the method comprising:
    forming a first core portion for a ceramic matrix composite component;
    embedding a hollow member into the first core portion at a desired location;
    wrapping the first core portion with a first ceramic matrix composite material;
    inserting a rod through the hollow member and into the first core portion;

assembling a second core portion to the first core portion such that the rod extends into the second core portion; and wrapping the first core portion and the second core portion with a second ceramic matrix composite material; and burning out the first core portion, the second core portion, the hollow member, and the rod from the ceramic matrix composite material subsequent to wrapping the first core portion and the second core portion with the second ceramic matrix composite material.

7. The method as recited in claim 6, wherein the hollow member is manufactured of a nylon.

\* \* \* \* \*